(12) United States Patent
Elks et al.

(10) Patent No.: US 7,420,474 B1
(45) Date of Patent: Sep. 2, 2008

(54) IDIOSYNCRATIC EMISSIONS FINGERPRINTING METHOD FOR IDENTIFYING ELECTRONIC DEVICES

(75) Inventors: Carl R. Elks, Earlysville, VA (US); Alec Bateman, Charlottesville, VA (US)

(73) Assignee: Barron Associates, Inc., Charlottesvilles, VA (US)

( * ) Notice: Subject to any disclaimer, the term of this patent is extended or adjusted under 35 U.S.C. 154(b) by 194 days.

(21) Appl. No.: 11/128,674

(22) Filed: May 13, 2005

(51) Int. Cl.
*G08B 21/00* (2006.01)
(52) U.S. Cl. .................... 340/678; 340/683; 705/76
(58) Field of Classification Search ............... 340/679, 340/682, 683, 5.8, 571, 678; 705/64, 59, 705/76
See application file for complete search history.

(56) References Cited

U.S. PATENT DOCUMENTS

| | | | |
|---|---|---|---|
| 4,688,169 A | 8/1987 | Joshi | |
| 5,719,938 A | 2/1998 | Haas | |
| 5,920,628 A | 7/1999 | Indeck | |
| 6,148,407 A | 11/2000 | Aucksmith | |
| 6,468,451 B1 | 10/2002 | Perez | |
| 6,489,402 B2 | 12/2002 | Ohyama | |
| 6,538,524 B1 | 3/2003 | Miller | |
| 6,574,732 B1 | 6/2003 | Steinberg | |
| 6,665,797 B1 | 12/2003 | Keung | |
| 6,697,948 B1 | 2/2004 | Rabin | |
| 6,748,544 B1 | 6/2004 | Challener | |
| 2003/0018895 A1 | 1/2003 | Morrison | |
| 2005/0035862 A1* | 2/2005 | Wildman et al. | 340/573.1 |
| 2005/0258940 A1* | 11/2005 | Quan | 340/10.3 |
| 2006/0001543 A1* | 1/2006 | Raskar et al. | 340/572.1 |

* cited by examiner

*Primary Examiner*—Jeff Hofsass
*Assistant Examiner*—Hongmin Fan
(74) *Attorney, Agent, or Firm*—Denis R. O'Brien

(57) ABSTRACT

A method of producing idiosyncratic electronic emissions fingerprints from an electronic device is disclosed wherein emissions produced by the electronic device are collected and converted into one or more digital electronic fingerprints. The method contemplates a variety of emissions, such as electromagnetic emissions (including radio frequency emissions) and vibrational emissions (including audio emissions). The emissions fingerprints of various types extracted from an electronic device can be combined into more complex emissions signatures, and/or they can be combined with conventional electronic fingerprints or other idiosyncratic identifying data. A drift-test method for compensation and correction of emissions fingerprint drift is also disclosed.

19 Claims, 7 Drawing Sheets

IDIOSYNCRATIC EMISSIONS FINGERPRINTING METHOD FOR IDENTIFYING ELECTRONIC DEVICES

FEDERALLY SPONSORED RESEARCH

This invention was made with Government support under contracts F33615-03-M-1554 and FA8650-04-C-8003 awarded by the U.S. Air Force Research Laboratory, AFRL/SNT. The Government has certain rights in this invention.

BACKGROUND OF THE INVENTION

1. Field of the Invention

The field of the invention comprises electronic fingerprinting methods for identifying computers and other electronic devices.

2. Scope and Usage of Certain Terms

The following lexicon sets forth the intended scope and meaning of certain terms and concepts used herein. Examples provided in this lexicon are intended to clarify and not to limit the meaning of the respective term. The definitions set forth here include the plural and grammatical variations of the terms defined. Unless otherwise noted, meanings of terms not included in this lexicon are to be determined by reference to first the specification and then, if necessary, the American Heritage Dictionary of the English Language, Third Edition, Houghton Mifflin Co., 1992, ver. 3.6p.

Electronic device—a device of the type having a case or cabinet and comprising at least one component within the case or cabinet whose operation depends on the controlled conduction of charge-carriers through the component. By way of example, but without limitation, Electronic device includes computers, computer accessories, video monitors, DVD and CD players and recorders, radios, televisions, magnetic recording and/or play-back devices, optical recording and/or playback devices.

Identify and ID—when used with respect to electronic devices, "identify" refers to 1) the act of ascertaining definitive characteristics of a particular electronic device; 2) the act of determining the particular electronic device from which ID data or fingerprints originate; and/or 3) the act of distinguishing a particular electronic device from all other electronic devices. "ID" refers to an identifying means or process based on a unique data representation, trait, or characteristic.

Idiosyncratic—traits, characteristics, and/or features of an individual electronic device that are sufficiently unique or peculiar, either alone or in combination, that they can be used to identify that electronic device. The degree of uniqueness or peculiarity implied by the term will be understood by those skilled in the art as being a function of the objectives, requirements, and specifications of the particular implementation of the invention, as discussed below. Unless explicitly modified, the term is not limited to any specific type or domain of feature, trait, or characteristic, but may be applied to, by way of example, emissions, intangible features or identifiers, component traits and specifications, performance characteristics, arbitrary alphanumeric identifiers, and the like.

Emission—refers to radiations, vibrations, and other emanations of one or more components of an electronic device. When used without modification, the term is intended to be understood in its broadest sense, without any limitation as to energy type, wavelength, speed of propagation, or other physical characteristics. By way of example, the term "emission" includes electromagnetic (EM) radiations, including radio-frequency ("RF") emissions, and vibrational emissions, such as acoustic waves produced, by electronic devices.

Emissions ID data and non-emissions ID data—"Emissions ID data" refers to data representative of and/or derived from idiosyncratic emissions produced by the electronic device being identified. "Non-emissions ID data" refers to idiosyncratic data used to identify electronic devices wherein the data are not derived from emissions. Examples of non-emissions ID data include alphanumeric identifiers for hardware and software, component specifications, performance characteristics, and the like.

Electronic fingerprint—a data representation of an idiosyncratic feature of an electronic device. "Electronic fingerprint" is a generic term that encompasses both non-emissions electronic fingerprints and emissions fingerprints (defined below). Verb forms of "electronic fingerprint" refer to a process of obtaining an electronic fingerprint.

Emissions and non-emissions fingerprints—"Emissions fingerprint" refers to an electronic fingerprint derived from emissions ID data. A "non-emissions fingerprint" is an electronic fingerprint derived from non-emissions ID data. A non-emissions fingerprint may also be referred to herein as a "conventional electronic fingerprint."

Collecting or acquiring emissions—to receive or detect emissions by a means, and in a manner, that produces an analog or digital representation of the emissions received or detected.

Signature—a compound data structure composed of a plurality of electronic fingerprints and/or non-electronic ID data such as encryption keys, passwords, and biometric data.

3. Statement of the Problem Solved by the Invention

The primary technical problem solved by the present invention is how to exploit the physical characteristics of an electronic device to obtain reliable and efficient electronic fingerprints and signatures from that device with a minimum of inconvenience to the end-user.

In virtually all fields of endeavor that employ electronic devices, there are situations in which it is desirable or necessary to be able to identify individual electronic devices. At the most basic level this is done simply by affixing a label bearing a unique alphanumeric identifier to the electronic device. However, for many applications, including many consumer and security applications, a far more sophisticated means of identifying electronic devices is required. For example, in the commercial software market, vendors often wish to restrict the use of a software program to an individual computer for which the program is licensed, thereby "locking-down" the program to a specific device. In such situations, there must be a means for identifying, often remotely or over the Internet, the individual computer as one that has permission to run the vendor's application. Similarly, vendors of audio-visual materials often wish to be able to lock-down their materials to a single electronic device that has been licensed to play the material, and yet do so in a way that is entirely transparent or minimally disruptive to the end-user.

The problem of identifying electronic devices is also commonly encountered in the design and implementation of secure computer systems. Computer security requires that executables, web sites, data/databases, and computer networks be maintained in a way that allows only specified individuals or specified computers to gain access to the protected executables, web sites, data, and networks. The importance of computer security to the nation is reflected by recent government interest in the subject. The Under Secretary of Defense for Acquisition, Technology, and Logistics has launched the Software Protection Initiative (SPI) as a means to prevent the unauthorized distribution and exploitation of national security application software by adversaries of the United States. The focus of SPI is to improve protection methods for critical scientific, engineering, and modeling and simulation software running on computing platforms ranging from desktops through supercomputers. In particular, SPI has identified key software technologies as vital technology resources for the national security and defense of the United States.

SPI, and computer security in general, encompass a broad range of issues and a broad range of requirements. The most vital and problematic aspect of computer security is protecting computers against malicious remote attacks, which often deny service to computer resources, provide the attacker with unauthorized access to computing resources or sensitive data, or destroy data. Such attacks often take the form of a virus or internet worm.

4. Existing Art

Solutions to the foregoing problems generally require the acquisition of a capability for identifying individual electronic devices. The current state of the art for achieving this capability includes, inter alia, (1) licensing protocols, (2) hardware dongles, (3) disk drive volume ID's and (4) encrypted CPU IDs. All of these methods have relative advantages, but any of these methods when used alone can be compromised with moderate effort—even combinations of these methods can be compromised by a knowledgeable and well-funded attacker. As a result, there has been intense interest in the security community in obtaining high quality idiosyncratic fingerprints and signatures from electronic devices, particularly fingerprints and signatures that are substantially invariant over the operating life of the device. The concept of a fingerprint or signature for computer identification provides a basis for an authentication method that overcomes many of the deficiencies of current approaches.

a. Electronic Fingerprints and Signatures Art

Electronic fingerprinting is a general term encompassing many diverse methods of producing or acquiring a code—the electronic fingerprint—that is peculiar to a specific computer or other electronic device. An electronic fingerprint can be used to prevent access to the device by anyone who cannot reproduce the code. Alternatively, an electronic fingerprint may be transmitted to and stored in remote devices that can then use the fingerprint to identify the device from which it originated. For instance, the systems administrator of a network can use a directory of electronic fingerprints when polling computers attached to the network in order to detect unauthorized connections. Once obtained, electronic fingerprints can be employed in a great number of different ways to maintain the security of individual machines or entire networks.

Given the impressive potential utility of electronic fingerprinting, many solutions have been proposed to solve the problem of how to produce efficient and robust electronic fingerprints. The general approach is to identify one or more features or traits of the electronic device to be protected and then represent those traits in a digital format that can be manipulated, encrypted, stored, transmitted, and subjected to interrogation and verification. To be useful, an electronic fingerprint must be idiosyncratic—that is it must be a sufficiently unique representation of the electronic device to provide the level of security required. Of course, the level of uniqueness that is required will depend on the situation. In some situations it is necessary to be able to distinguish one individual device from all others—absolute identity. In other situations it is sufficient to identify one or more electronic devices as members of a defined class—for instance, identifying computers using a particular version of an operating system or identifying all computers connected to a network.

For most applications a single ID trait or characteristic is not sufficiently unique for electronic fingerprinting; therefore, electronic signatures are often constructed from a plurality of fingerprints and other ID traits which, when taken together, provide a sufficient level of uniqueness. Traits that are commonly combined to produce electronic signatures include alphanumeric identifiers arbitrarily assigned to one or more components of the electronic device; code segments embedded into operating systems, drivers, or other software; performance characteristics—baud rates for modems, clock rates for CPU's, spin rates for DVD players/recorders. Most of these characteristics used alone can be easily hacked by interrogating the system or the component; however, by combining a number of such characteristics and by employing encryption/authentication processes, it is possible to derive an electronic signature that is reasonably unique for the electronic device.

U.S. Pat. No. 6,148,407 to Aucksmith is representative of the foregoing approach of deriving and employing electronic signatures for computers from a plurality of standard traits. Aucksmith discloses the use of traits such as processor ID, cache ID, memory controller, BIOS version, Ethernet address, and CD-ROM type. The traits chosen are converted to discrete digital reference values, which are then combined into an aggregate signature. This signature can then be encrypted, stored, transmitted, manipulated, and interrogated. An agent, entity, or software application that "knows" the signature, the encryption technique, and the storage location can interrogate the computer on the basis of its signature to determine whether or not the computer has access rights to the application, data, or network being protected.

b. Electronic Device Emissions Art

It is well known that many electronic components—such as CPU's, buses, drives, motors, clocks—produce EM emissions, most commonly in the RF portion of the EM spectrum. In addition, some electronic components—such as fans and motors—produce vibrational emissions, which may be in the human audible frequency range or may be above or below that range. Such EM and vibrational emissions are generally considered to be a bane of good electronic design. For instance, the Federal Communications Commission regulates, and often prohibits, the use of many consumer electronic products in airplanes because the RF emissions of the devices can interfere with radio communications or navigational instruments that are necessary for the safety of the aircraft. It is also generally considered advantageous to mitigate vibrational emissions, many of which are annoying to the user. Thus, much of the literature related to EM and vibrational emissions from electronic devices is devoted to ways to eliminate or reduce such emissions. For example, U.S. Pat. No. 6,538,524 to Miller advocates electrically lossy transmission system to reduce RF emissions in computers. And U.S. Pat. Nos. 6,489, 402 to Ohyama et al. and 6,468,451 describe advances in vibrational and acoustic insulation used in electronic devices.

BRIEF SUMMARY OF THE INVENTION

In contrast to design constraints intended to reduce or eliminate emissions from electronic devices, the present invention recognizes that emissions produced by electronic devices are idiosyncratic characteristics that can be exploited for the purposes of electronic fingerprinting. Consequently, we set forth here novel methods for extracting idiosyncratic ID data from emissions and for converting those data into electronic fingerprints.

A first object of the invention is to provide methods for collecting emissions produced by one or more components of an electronic device.

A second object of the invention is to provide methods for constructing an emissions fingerprint for an electronic device using information representative of emissions produced by one or more components of the electronic device.

A third object of the invention is to provide methods for combining one or more emissions fingerprints with non-emissions data in order to construct an idiosyncratic signature for an electronic device.

BRIEF DESCRIPTION OF THE DRAWINGS

In the drawings identical reference numbers are employed to identify identical elements. The sizes and relative positions of the elements in the drawings are not necessarily to scale. For example, thicknesses are generally not drawn to scale and are enlarged to insure comprehension of the drawings.

DETAILED DESCRIPTION OF THE INVENTION

The inventive concepts and novel features of the invention are described here with reference to a specific application of preferred embodiments of the invention: computers and computer systems. These embodiments represent the best mode known to us for practicing the invention. Although the steps and elements of the invention, as well as their structural and functional relationships, may be easily comprehended with respect to the preferred embodiments, it is to be noted that these disclosures are representative of many possible embodiments that incorporate the inventive concepts of our invention. Disclosures of the invention as applied to computers and computer systems are intended to be for illustrative and heuristic purposes, and are not intended to limit the scope of the invention to any particular application.

1. Overview of the Method of Obtaining Emissions Fingerprints—FIGS. 1-3

Figure 1:
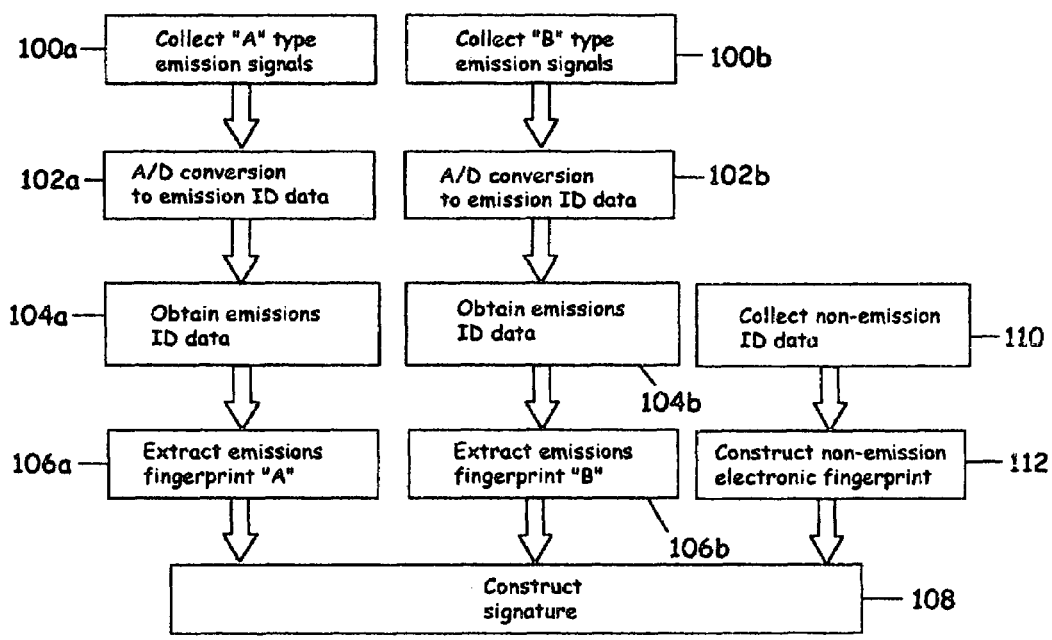
FIG. 1 is a flow-chart of the overall method of producing emissions fingerprints and signatures by the methods disclosed herein.

An overview of the preferred method of obtaining emissions fingerprints is summarized in the step-diagram of FIG. 1. The figure assumes that two different types of emissions are being exploited for electronic fingerprinting. This discussion arbitrarily assumes the emissions signals designated as type "A" are RF signals, and those designated as type "B" are audio signals. This discussion will disclose how both of these types of emissions fingerprints are obtained and combined into an emissions fingerprints and signatures. However, this example is not meant to be limiting as to the numbers, types, or combinations of emissions that can be employed to construct emissions fingerprints.

Referring to FIG. 1, at step 100a RF emissions are acquired by an RF antenna and receiver device. The analogous step 100b depicts reception of acoustic emissions by means of a microphone. Structural details of the devices used to obtain the signals are disclosed below.

Figure 2:
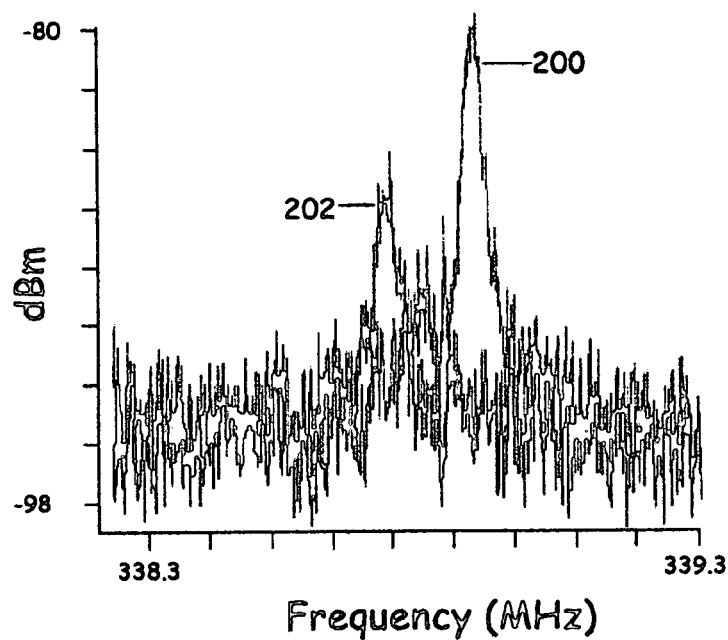
FIG. 2 is an example of RF emissions that are used to produce emissions fingerprints by the methods disclosed herein.

FIG. 2 illustrates examples of RF spectra that are obtained at step 100a of FIG. 1. FIG. 2 shows superimposed segments of two RF spectra obtained from two desk-top computers, designated herein as Computer #1 and Computer #2. These computers were identical with respect to manufacturer, type, model, and hardware configurations. Both were new when tested and had been purchased at the same time and from the same vendor. Our goal was to obtain computers as nearly identical as possible in order to demonstrate that RF and audio emissions fingerprints can be obtained that distinguish identical computers from each other.

The range of the RF spectra recorded from each computer was from 110 MHz to 1.1 GHz—an RF range centered at approximately the bus frequency of the computers (533 MHz), with the low end of the recorded spectra chosen to avoid the FM radio band. Only a segment of the RF spectra collected is shown in FIG. 2—from 338.3 MHz to 339.3 MHz. Peak 200 represents a high-energy peak for Computer #1, and peak 202 represents a distinct high-energy peak for Computer #2. Such peaks are referred to herein as "RF events," which is defined in more detail below. The point of FIG. 2 is simply to illustrate examples of RF events from two identical computers, which RF events can be used by the methods of the present invention to identify the computers and to distinguish one computer from another.

Figure 3:
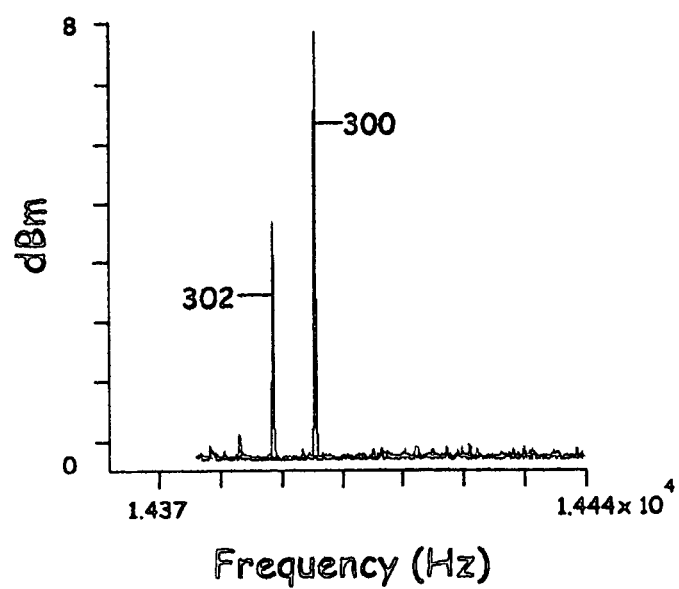
FIG. 3 is an example of Fast Fourier Transformation ("FFT") peaks derived from audio spectra and used to produce emissions fingerprints by the methods disclosed herein.

FIG. 3 shows analogous "audio events" obtained from Computer #1 and Computer #2. The raw data were collected over a range of vibrational emissions from 0 to 30,720 Hz. Only a segment of the entire frequency range sampled is shown in FIG. 3—from 14.37 KHz to 14.44 KHz. The data shown in FIG. 3 are the result of converting the analog voltage vs. time outputs of the recording microphones into frequency domain using FFT. The two FFT peaks shown represent discrete signals from Computer #1 300 and Computer #2 302 superimposed on the same graph.

Audio and RF emissions, such as those represented in FIGS. 2 and 3, are normally, but not necessarily, the aggregate of more than one component of the electronic device. For instance, RF events used to construct an RF emissions fingerprint for a computer will most often represent the aggregate of all measurable RF signals that are emitted by the components that comprise the computer, including hard drives, clocks, and bus signals. Likewise, acoustic emissions will likely have a plurality of origins. The preferred method relies simply on the aggregate of the signals that reach the antenna, microphone, or other emissions sensor. Of course, when an electronic component that contributes to an emissions signal is added to or deleted from the device, it will be necessary to obtain a new emissions fingerprint for that device. This is easily achieved by the methods disclosed herein. To the extent that discrete emissions can be collected from one of a plurality of components of an electronic device, the methods disclosed herein can be easily adapted to using such individual emissions to produce emissions fingerprints for that component.

Referring again to FIG. 1, at step 102 *a* & *b*, the analog emission signals are converted to a primitive digital emission ID data structure by employing standard analog-to-digital ("A/D") conversion techniques well known to those familiar with the art of digital electronics.

Referring again to FIG. 1, at step 104 *a* & *b*, from the digitized spectral data, idiosyncratic emissions data—ID data—are extracted. The methods for carrying out this step are disclosed in detail in sections 2 and 3 under the present heading.

Referring again to FIG. 1, at steps 106 *a* & *b* emissions fingerprints are constructed out of the emissions ID data. In applications where only one type of emissions fingerprint is to be employed, the process essentially ends at step 106. Where two or more fingerprints are to be compounded into a signature, the process continues to step 108. If the signature is to also include non-emissions ID data, such data are collected at step 110, converted into an electronic fingerprint at step 112, and combined with the emissions fingerprint(s) to form a plenary signature at step 108. Methods for constructing conventional electronic fingerprints are not within the scope of this invention and are not described herein. Many such methods are disclosed in the literature, for example U.S. Pat. No. 6,148,407 to Aucksmith, discussed above.

2. Techniques for Acquiring Raw Emissions Data from Electronic Devices

The currently preferred techniques and the best modes known to us for extracting emissions fingerprints from RF and audio emissions data are now disclosed. We make no attempt to inventory all of the many techniques available; we merely set forth here techniques and devices that represent the best modes known to us for practicing our invention. From the following disclosures various modifications and alternatives will be obvious to those skilled in the art.

It is our preference to obtain RF and audio signals from inside the case of the electronic device being fingerprinted. This constraint, while not a limitation of the invention, does present a limitation to the physical size of emissions sensors that can be employed. Fortunately, sufficiently small RF and audio sensors are currently available and it is possible to combine on a single PCI bus card the antennae, microphones, amplifiers, and supporting components necessary for sampling both RF and audio signals produced by the computer into which the card is installed. Computing means for extracting and storing the emissions fingerprints from the emissions signals can also be incorporated into such a card. Alternatively, such computing means may be a part of the protected device or may be maintained at a remote location. The great advantage of having the emissions sensors installed within the protected device is that they can be used to repeatedly or continuously collect raw emissions data for conversion to emissions fingerprints and signatures while the device is in operation.

The RF ID data obtained for the RF fingerprinting methods disclosed herein were acquired with an Advantest R3131A signal analyzer and a dipole antenna. Although the choice or design of hardware and software for acquiring, amplifying, and analyzing RF emissions produced by electronic devices will be obvious to those skilled in the art, the choice or design of an appropriate antenna requires careful consideration of the electronic device's physical characteristics as well as the RF frequencies and the bandwidth from which fingerprints will be extracted. The following disclosures will enable one skilled in the art to choose or design appropriate antennae without undue experimentation.

With respect to RF fingerprinting of computers, specifically, it is noted that RF spectra are composed of RF signals emitted by a number of individual electronic components of the computer. Examples of such components include clocks and busses that switch dynamically, and power supplies, which often switch at frequencies from 200 KHz to 1 MHz. In addition to such relatively "simple" RF emissions, resonance properties of the computer cabinet can promote frequency spectra comprising complex signals. This is called signal mixing. When signal mixing occurs, two signals, $f_1$ and $f_2$, can combine to create a new signal, $f_3$, under some operation like addition, subtraction, or multiplication. For instance, $f_3=f_1+f_2$ could occur for signals in the 400 MHz band, while $f_4=f_3-f_2$ could occur simultaneously for signals in the 800 MHz band. The final result of mixing is largely dependent on the size and shape of the cabinet enclosing the components and electrical properties of the components (energy of the signals, type of spectrum a signal produces, etc.). The advantage of mixed signals is that they greatly increase the occurrence of idiosyncratic events in the RF spectrum. We exploit signal mixing by acquiring the RF signals from inside the case of the electronic device being fingerprinted.

The principal sensor for RF energy is the antenna. The selection and design of the right antenna to achieve the objectives of our invention is governed mainly by three factors: (1) the expected frequencies of the RF events to be detected and the bandwidth to be probed; 2) gain efficiency; and, 3) antenna size. We prefer a bandwidth of from about 100 MHz to about 1 GHz, which defines the requisite tradeoffs between antenna size and gain efficiency. In order to take maximum advantage of the signal mixing phenomenon discussed above, we prefer to obtain RF signals from inside a PC cabinet, and, ultimately, from a PCI card. Therefore, our tradeoff between antenna size and gain efficiency is biased toward compact size and conformity to PC board layout.

In generating the RF emissions fingerprints in the examples provided herein, we employed a dipole antenna tuned for approximately 800 MHz-small enough to fit inside the computer case but still able to clearly detect signals from below 100 MHz to above 1 GHz. Although the dipole is somewhat inefficient when selecting signals away from its tuned bandwidth of 800 MHz, it is nevertheless able to detect signals as much as five bandwidth factors away from its tuned center frequency.

We have identified several commercially-available antennae small enough to be mounted on a PC board. The Lynx Technologies JJB-Series antennae, the Lynx "Splatch" antenna, which uses a grounded line technique, and the Lynx HE-series of helical wound antennae are examples. Our preference is helical wound or log-normal antennae, which have reduced performance in terms of voltage standing wave ratio and gain, but have larger bandwidth coverage.

Raw emissions data for audio emissions fingerprints are acquired from electronic devices by utilizing a low-pressure microphone. Again, because we prefer to record the audio emissions from inside the device, and, preferably, from a microphone mounted on a PCI board, size is a major constraint. Furthermore, early experiments indicated that because the sound levels inside the computer cabinets are low, laboratory quality microphones having a moderately high sensitivity are required. In order to obtain audio spectra from within small enclosed quarters and in close proximity to hard, reflective surfaces, a pressure-field microphone is most appropriate. Reverberations that do not contribute to the fingerprint constitute unwanted signal noise, but such noise can be sufficiently eliminated by the choice of microphone.

With the foregoing design constraints in mind we have identified a number of microphones that are on the order of ½ inch long and that meet the requirements of the invention. These include, by way of example and not limitation, the Norsonic Model 1227 (NG), the Norsonic Model 1237 (NG), and the B&D Model 4942. All of these microphones have a least a 50 mV/pascal of nominal sensitivity, which is sufficient to detect the low sound waves emitted by computer cooling fans and disks.

3. Extraction of Idiosyncratic RF Emissions ID Data and Construction of RF Emissions Fingerprint—FIG. 4.

At step 104a of FIG. 1, idiosyncratic emissions data are extracted from the primitive digital RF emissions data. The present section discloses the details of how this step is accomplished. Given the present disclosures with respect to the extraction of both RF and audio emissions fingerprints, many other techniques will become obvious to those skilled in the art. Having a large and indeterminate variety of methods promotes the objectives of the invention because the variety of methods makes it more difficult for hackers to reconstruct the emissions fingerprint of a targeted machine since the emissions fingerprint is a function of not just the machine's emission characteristics but also the computational processes that transform the emissions data into the fingerprint.

Figure 4:
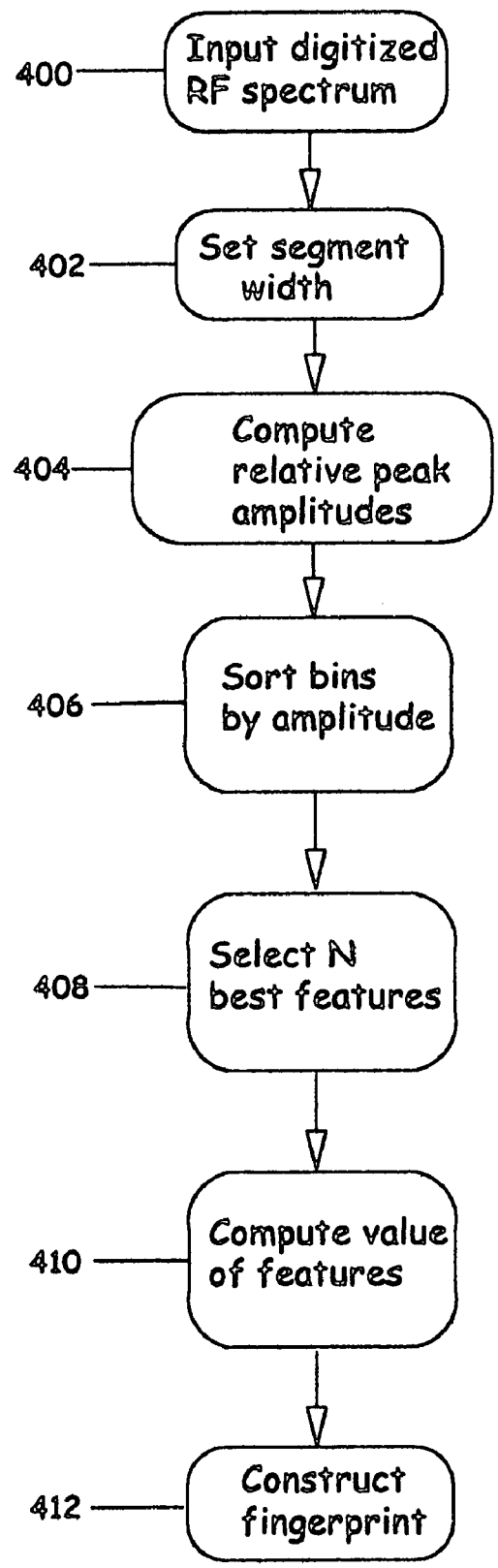
FIG. 4 is a flow-chart of the preferred method for extracting emissions fingerprints from RF signals.

FIG. 4 is a flow-chart of a simple, preferred peak detection algorithm used to extract idiosyncratic emissions data from an RF emissions spectrum. At step 400 the digitized spectrum obtained at step 102 of FIG. 1 serves as the input to the algorithm. At step 402 the total RF bandwidth is divided into segments "bins." Specifically, a total bandwidth of from about 100 MHz to about 1.5 GHz is arbitrarily divided into 500 equal bins of 2.8 MHz. Only the two largest peaks in each bin are analyzed—a simplification that greatly increases the computational efficiency of the algorithm because it eliminates the need to measure every peak in the spectrum. At step 404 the relative peak amplitude, i.e., the height of the largest peak above the second largest peak, is computed for each bin. At step 406 the bins are sorted by relative amplitude and at step 408 the N bins with the highest relative amplitudes are selected as the ranges containing the best features.

It will be readily appreciated that achieving good discrimination power in the fingerprint requires a balance between the breadth of the frequency bins and the number of bins. Broader frequency bins will include more peaks and thus make relative amplitude information more prominent in the fingerprint, while narrower, more numerous frequency bins mean more potential features from which to create the fingerprint. Of course, as the number of RF features used in the fingerprint increases, so does the computing overhead. Without undue experimentation, an artisan employing the techniques disclosed herein will be able to maximize the ratio of discrimination power to computing overhead to meet the requirements of a given situation simply by adjusting the bin width and the number of features input at steps 402 and 408, respectively.

To construct a high quality fingerprint, steps 400 to 404 are repeated for multiple data sets and the relative peak amplitudes for each bin are averaged across data sets prior to step 406. At step 410, a value for the features is computed as the mean over multiple data sets of the frequency of the primary (largest amplitude) peak in the bin.

Construction of the fingerprint at step 412 involves identifying the mean frequency of the primary peak in each selected data bin and constructing a window around this mean frequency based on the standard deviation of the primary peak frequency locations across the multiple data sets used in constructing the fingerprint. A voting threshold for the number of matching features required for an overall fingerprint match must also be established. To check the fingerprint of an observed computer against an established fingerprint, the RF spectrum of the observed computer is recorded and the appropriate frequency bins are extracted. The recording may also be limited to the desired bins if permitted by the hardware. The primary peak in each bin is then identified and its frequency is compared to the window specified in the fingerprint. If the frequency of a given feature falls within the window, then that feature is said to match the known fingerprint. The ultimate accept or reject decision is based on the number of individual features that match. The threshold of the number of matching features required to declare a fingerprint match and the width of each acceptance window in terms of standard deviation of the data will vary based on the desired tradeoff between false acceptance and false rejection rates. Appropriate selections for these parameters can be easily made by a person skilled in the art based on the requirements of the particular application.

4. Extraction of Idiosyncratic Audio Emissions ID Data and Construction of Audio Emissions Fingerprints—FIGS. 5-6.

In addition, or as an alternative, to using RF emissions to construct an emissions fingerprint, such fingerprints can also be constructed from vibrational emissions, and particularly, audio emissions. A preferred method for extracting idiosyncratic audio emissions data from raw audio spectra is now disclosed.

Figure 5:
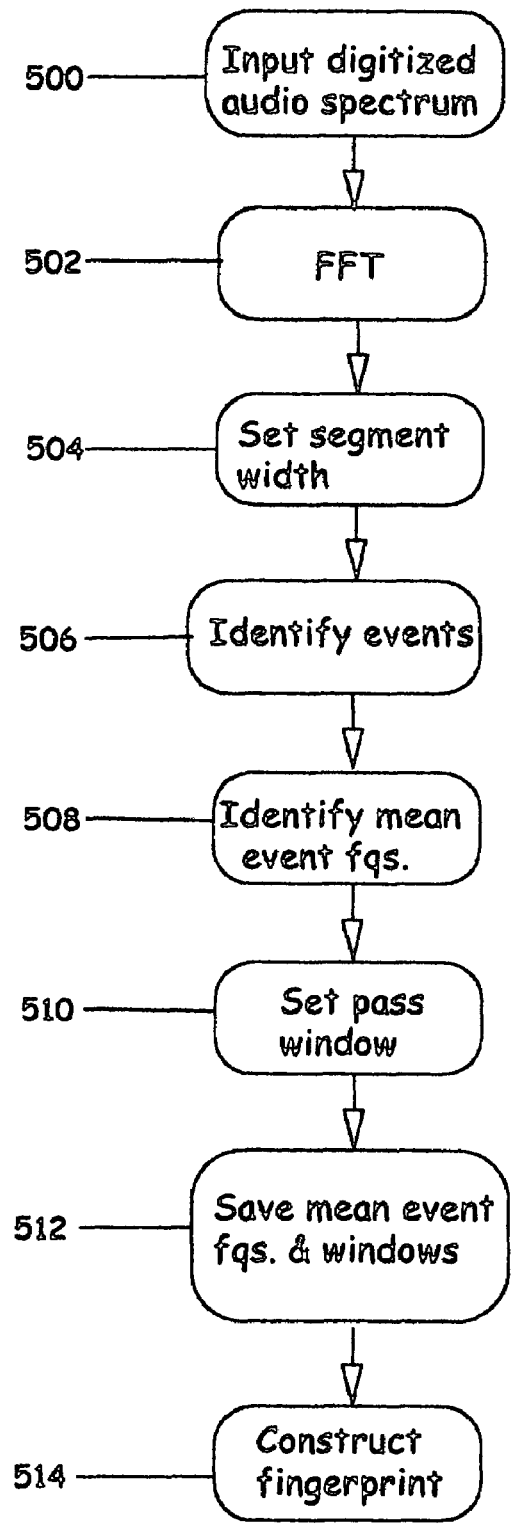
FIG. 5 is a flow-chart of the preferred method for extracting emissions fingerprints from audio signals.

By referring to FIG. 5, our preferred method of extracting the audio emissions fingerprints from raw data using a mean FFT-peak analysis technique can be easily understood. In the example discussed here we obtained idiosyncratic audio emissions ID data from the same two computers used to extract RF emissions fingerprints, as disclosed above. We acquired the analog audio spectra for each computer through 10 sampling sessions, with a sampling frequency of 61440 Hz. Each sampling session lasted 10 seconds. These data were converted from analog to digital and passed 500 to a conventional FFT sub-routine 502, which produces frequency domain outputs similar to those illustrated in FIG. 3 and discussed above.

At step 504 of FIG. 5 the total bandwidth of the audio spectrum is divided into a plurality of equally wide frequency segments. The width of the segments is set so as to produce 500 segments from the total bandwidth sampled; however, the number of segments is arbitrary and can vary according to discrimination needs and computing resources. We have found 500 segments to be adequate and practical.

At step 506 each of the 500 frequency segments is analyzed for the occurrence of an audio event. This is done by determining the difference between the amplitudes of the largest FFT peak in the segment and the next largest FFT peak. First, using the 10 data sets, amplitudes of the largest and second largest FFT peaks for each segment were calculated. Then the arithmetic difference between these peaks was obtained and the results averaged to give us what is referred to herein as a "mean peak differential" of each segment. Next we identified the 20 largest mean peak differentials from the 500 segments. For each of these 20 segments, the largest mean FFT peak is then defined as an "audio event." We empirically determined that 20 such audio events are sufficient to produce audio emissions fingerprints having excellent discrimination capabilities. Discrimination power can be increased or decreased by adjusting this number upwards or downwards, respectively.

Defining an audio event on the basis of the largest mean peak differentials insures that 1) the segment contributing to the fingerprint contains significant information and 2) small changes in peak values will not likely alter which peak is identified as the dominant FFT peak. This is important because it is the frequency at which the audio event (i.e., dominant FFT peak) occurs, and not the amplitude of the peak, that ultimately comprises the audio emissions fingerprint.

We now focus on the 20 audio events identified at step 506. First, at step 508, we determine at what frequency within each segment the largest mean FFT peak occurs. This frequency is referred to as a "mean event frequency;" there is one for each of the 20 segments. This set of 20 mean event frequencies, in effect, represents the raw audio emissions fingerprint. However, because of imprecision inherent in obtaining audio spectra, it is necessary to establish a window of variance centered on the mean event frequency, which window determines whether an unknown audio event is to be considered to be a valid audio event. This window is referred to herein as a "pass/fail window." At step 510 we set "pass/fail windows" for each of the 20 events.

Those skilled in the art will recognize that suitable pass/fail windows can be calculated by applying statistical techniques, such as those related to the variance of the 10 data sets from which the means are calculated. Our approach is both effective and efficient. First, it is to be recalled that each mean event frequency is the frequency at which the largest mean FFT peak occurs within the segment being examined. These means are calculated from the 10 data sets. Within those 10 data sets, we identify the individual FFT peak that deviates the greatest from the mean FFT peak. We then note the frequency at which that maximally deviant FFT peak occurs and we determine the difference between frequency of the deviant peak and the mean event frequency. This we refer to as $\Delta_{fq}$. We then arbitrarily set x, the width of the pass/fail window, to be 10 times $\Delta_{fq}$, with the center of the window at the mean event frequency.

Figure 6:
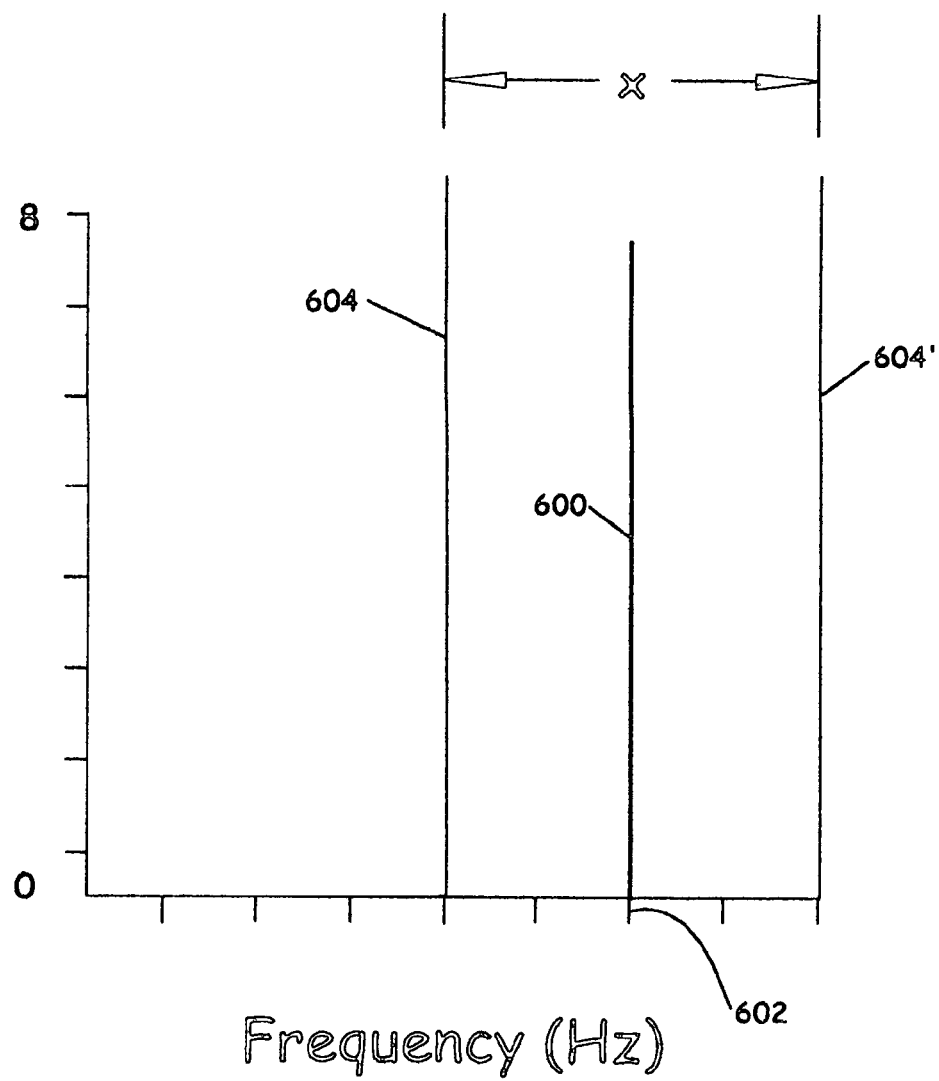
FIG. 6 illustrates the calculation of a pass/fail window for an audio emissions fingerprint.

FIG. 6 illustrates the method of calculating the pass/fail window. Peak 600 represents the largest mean FFT peak, or "audio event," of the segment shown. The frequency at 602 is therefore the mean event frequency. The width, x, of the pass/fail window is calculated by finding $\Delta_{fq}$ the difference between the mean event frequency 602 and the frequency of the FFT peak contributing to 600 that deviates the greatest from the mean event frequency, and then multiplying $\Delta_{fq}$ by 10. The window is then centered about the mean event frequency and bounded by frequencies 604 and 604'.

The 20 mean event frequencies and their associated pass/fail windows data pairs represent the audio emissions fingerprint. The actual fingerprint data structure is most conveniently produced by constructing a 2-dimensional array for the data pairs having n elements, where n is the number of audio events. These mean event frequency/window-width data pairs can then be utilized as the electronic fingerprint or combined with other emissions fingerprints or conventional electronic fingerprints to form more complex electronic signatures.

5. Using Emissions Fingerprints to Identify Electronic Devices—FIGS. 7-8.

Generally speaking emissions fingerprints can be used in the same ways as conventional electronic fingerprints. A standard process is that a fingerprint or signature is generated for a first device, referred to herein as the "protected" device. That fingerprint/signature becomes a reference or "template," and is stored in a manner and at a location that permits it to be accessed and compared as necessary, but under controlled conditions. The template may be encrypted for additional security. The template is then compared to fingerprints obtained from unknown and/or suspect devices by using the same methods used to construct the template. Any device that produces a fingerprint/signature that matches the template is presumed to be the protected device.

Figure 7:
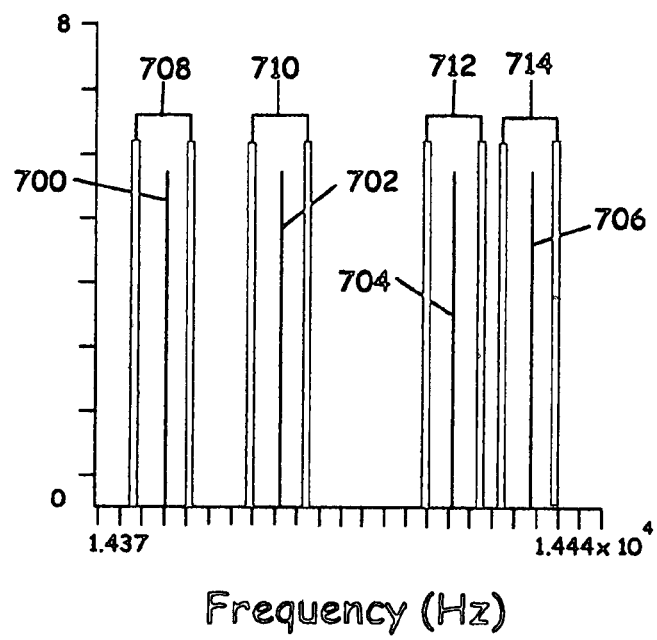
FIG. 7 and FIG. 8 represent the use of audio emissions fingerprinting to distinguish two electronic devices.
Figure 8:
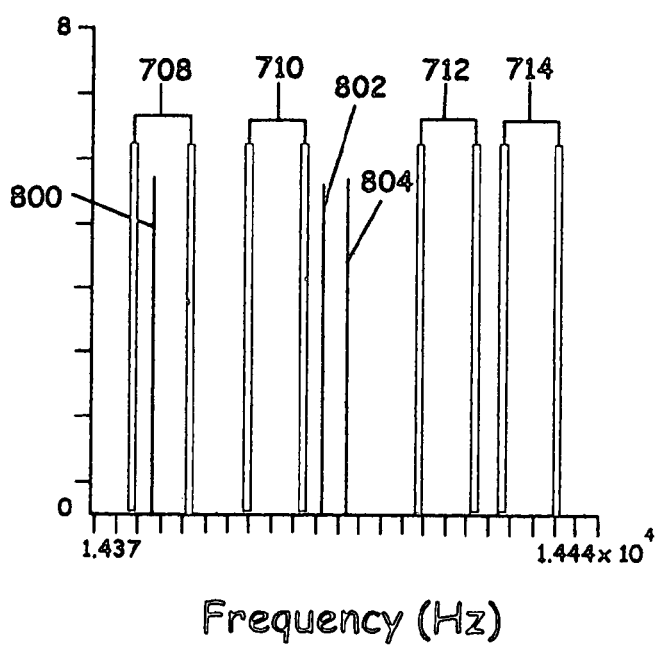

FIG. 7 and FIG. 8 represent the use of audio emissions fingerprinting to distinguish two electronic devices. FIG. 7 illustrates a partial template of an audio spectrum from an electronic device in which four audio events 700, 702, 704, 706 are detected. Each of these events is associated with its pass/fail window, designated, respectively, 708, 710, 712 and 714. FIG. 8 shows three audio events 800, 802, 804 of an unknown electronic device that were detected in the same frequency segment. Event 800 falls within pass/fail window 708 and is therefore ranked as "pass." However, events 802 and 804 do not fall within any of the pass/fail windows and are each consequently ranked as "fail." The entire spectrum of the unknown device is analyzed in this way for each of the 20 segments of the template. Any events detected within those analyzed segments are given either a pass or a fail vote depending upon whether or not they fall within the pass/fail window of the template. Since a total of 20 events are analyzed, a perfect match is 20 pass votes. However, perfect matching may be too stringent a criterion for many systems, depending upon the variance in the emissions and their measurements. In our experience setting a cut-off of from about to about 19 pass votes out of a total of 20 analyzed events was sufficient to yield perfect discrimination.

6. Drift Compensation and Correction

One potential source of variation in emissions-based fingerprinting is drift of the emissions over time, either with respect to peak frequency or amplitude. Such drift presents a problem when an emissions fingerprint obtained at one point in time is used as a reference or emissions fingerprint "template" for comparisons made at later points in time. Even if a fingerprint obtained at a subsequent time is extracted from the same machine as the template, it will be rejected as not bona fide if there has been sufficient drift. In our experience, drift is to be expected with respect to both audio and RF emissions; and hence we developed a drift compensation and correction methodology, which methodology is referred to herein as a "drift-test," to recognize and respond to emissions drift.

Figure 9:
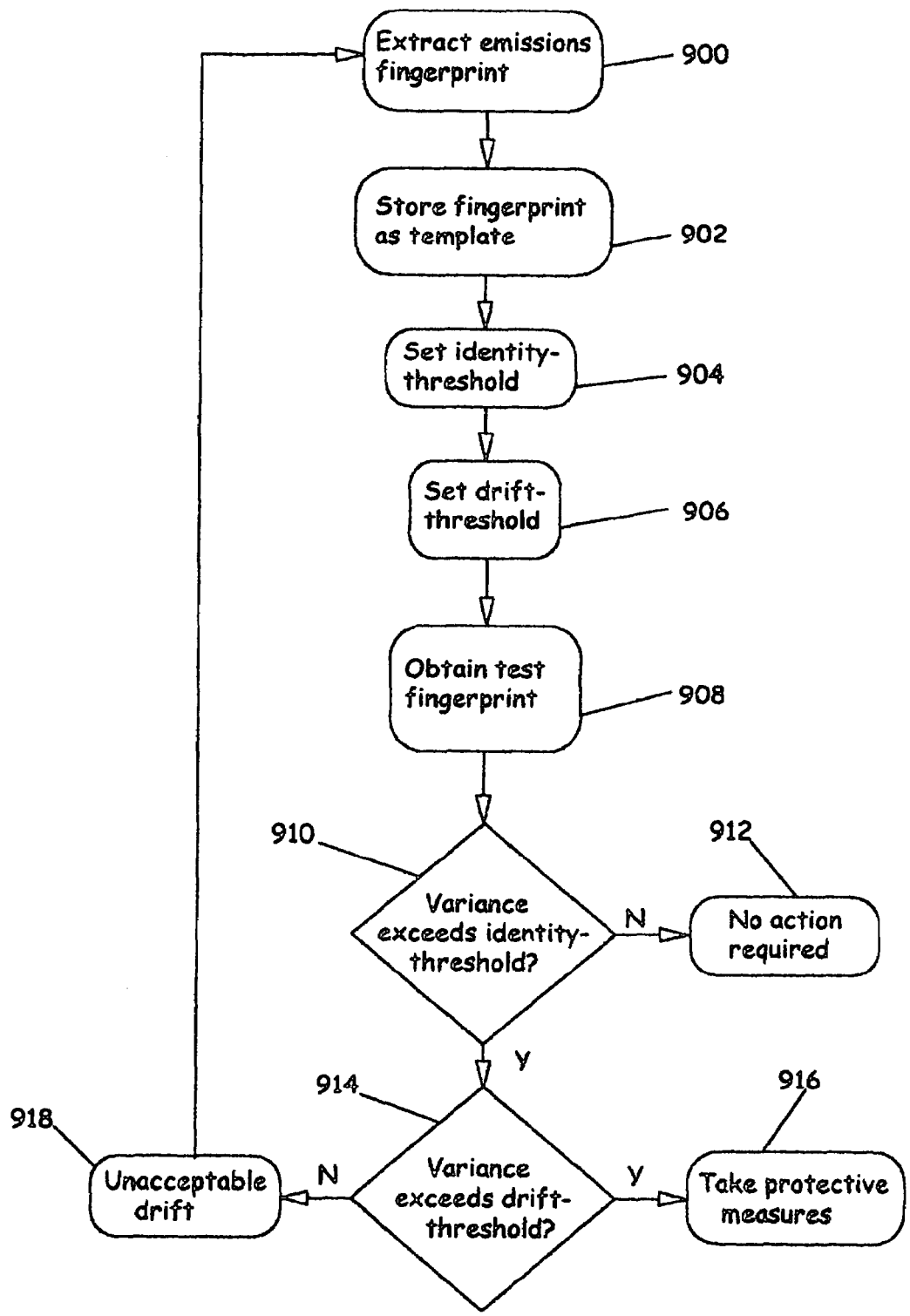
FIG. 9 is a flow-chart of the drift compensation and correction technique disclosed herein.

Referring to FIG. 9, initial audio and RF emissions fingerprints are obtained for the protected device 900 and stored as the emissions fingerprint template. 902 An "identity-tolerance" value is set 904 and a larger "drift-tolerance" value is set 906. The identity-tolerance and drift-tolerance parameters are determined empirically to meet the needs of the specific application or by means of a variety of statistical techniques that will be obvious to those skilled in the art.

Periodically the audio and/or RF spectra produced by a device of interest, presumed initially to be the protected device, are sampled and "test fingerprints" are produced therefrom. 908 The test fingerprints may be an entire fingerprint or some portion thereof. The test fingerprints are compared to the template. 910 If the test-fingerprints are substantially identical to the template, significant drift has not occurred and no action is taken. 912 By "substantially identical" we mean that the test-fingerprints and the template coincide within the identity-tolerance value. If the amount of variance between the template and test fingerprint exceeds the identity-tolerance but does not exceed a larger, predetermined "drift-tolerance," 914 then the variance is presumed to represent drift 918 and a new template is produced 900 and stored.

902 If the variance surpasses the drift-tolerance, then a presumption is made that a breach of security has occurred and that the protected device is not the source of the test fingerprints; protective measures are then initiated, 916 such as closing down the system or notifying the administrator.

How often such drift-tests are carried out is determined by a number of factors such as the empirically determined or statistically predicted rate of drift. One advantage of having the sensors and data handling means for producing emissions fingerprints physically integrated into the electronic device being protected is that these drift-tests can be carried out automatically and as often as necessary without undue interruption of the device's function.

SUMMARY

From the foregoing description, the novelty, utility, and means of using our invention will be readily apprehended. It is to be understood that our invention is not limited to the embodiments disclosed above but encompasses any and all embodiments lying within the scope of the following claims. The metes and bounds of our invention are to be ascertained by referring to the claims in conjunction with the figures and the foregoing disclosures.

We claim:

1. An emissions fingerprinting method comprising the steps of:
    (1a) collecting at least one type of emissions produced by an electronic device;
    (1b) converting the emissions collected at step (1a) to emissions ID data; and,
    (1c) constructing at least one emissions fingerprint from the emissions ID data of step (1b).

2. The method of claim 1 wherein at least one type of emissions collected at step (1a) is an electromagnetic (EM) emission.

3. The method of claim 1 wherein at least one type of emissions collected at step (1a) is a radio frequency (RF) emission.

4. The method of claim 1 wherein at least one type of emissions collected at step (1a) is a vibrational emission.

5. The method of claim 1 wherein at least one type of emissions collected at step (1a) is an audio emission.

6. The method of claim 1 further comprising the step of placing inside the electronic device at least one sensor for carrying out step (1a).

7. The method of claim 6 wherein at least one of the sensors is an antenna.

8. The method of claim 6 wherein at least one of the sensors is a microphone.

9. The method of claim 1 further comprising the step of combining at least two emissions fingerprints constructed at step (1c) to form an emissions signature.

10. The method of claim 1 further comprising the steps of:
    (10a) obtaining non-emissions ID data identifying the electronic device; and
    (10b) forming a signature by combining the non-emissions ID data obtained at step (10a) with at least one of the emissions fingerprints constructed at step (1c).

11. The method of claim 1 wherein Step (1c) comprises a peak detection algorithm.

12. The method of claim 1 wherein Step (1c) comprises a mean fast Fourier transformation (FFT) peak differential analysis.

13. A method for verifying identifying an electronic device, said method comprising the steps of:
    (13a) collecting at least one type of emissions produced by the electronic device;
    (13b) converting the emissions collected at step (13a) to emissions ID data;
    (13c) constructing at least one emissions fingerprint from the emissions ID data of step (13b);
    (13d) using the emissions fingerprint constructed at step (13c) to identify the electronic device; and,
    (13e) comparing the emissions fingerprint of step (13d) to an emissions fingerprint previously obtained for the electronic device, whereby if the two emissions fingerprints match the identify of the electronic device is verified.

14. The method of claim 13 wherein the previously obtained emissions fingerprint of step (13d) is in the form of a fingerprint template.

15. The method of claim 14 further comprising the steps of:
    (15a) establishing an identity-tolerance parameter for the emissions fingerprint template;
    (15b) establishing a drift-tolerance parameter for the emissions fingerprint template;
    (15c) initiating protective measures if the variance between the emissions fingerprint template and the fingerprint constructed at Step (13c) exceeds the drift-tolerance parameter established at Step (15b); and,
    (15d) obtaining a new emissions fingerprint template from the electronic device if the variance between the emissions fingerprint template and the fingerprint constructed at step (13c) exceeds the identity-tolerance parameter established at Step (18a) but does not exceed the drift-tolerance parameter established at Step (15b).

16. The method of claim 13 further comprising the step of combining at least two emissions fingerprints constructed at step (13c) to form an emissions signature.

17. The method of claim 13 further comprising the steps of:
    (17a) obtaining non-emissions ID data identifying the electronic device; and
    (17b) forming a signature by combining the non-emissions ID data obtained at step (17a) with at least one of the emissions fingerprints constructed at step (13c).

18. The method of claim 13 wherein Step (13c) comprises applying at least one of: i) a peak detection algorithm, and ii) a mean fast Fourier transformation (FFT) peak differential analysis.

19. The method of claim 13 wherein the emissions collected at step (13a) includes at least one of: i) electromagnetic radiation; ii) vibrational emissions, and iii) audio emissions.

* * * * *